US008313082B2

(12) United States Patent
Garcia et al.

(10) Patent No.: US 8,313,082 B2
(45) Date of Patent: Nov. 20, 2012

(54) PROPORTIONAL POSITION FEEDBACK HYDRAULIC SERVO SYSTEM

(75) Inventors: Gary Garcia, Geneva, NY (US); Jeff Tyler, Newark, NY (US)

(73) Assignee: G. W. Lisk Company, Inc., Clifton Springs, NY (US)

( * ) Notice: Subject to any disclaimer, the term of this patent is extended or adjusted under 35 U.S.C. 154(b) by 305 days.

(21) Appl. No.: 12/813,977

(22) Filed: Jun. 11, 2010

(65) Prior Publication Data

US 2010/0313981 A1 Dec. 16, 2010

Related U.S. Application Data

(60) Provisional application No. 61/186,473, filed on Jun. 12, 2009.

(51) Int. Cl.
*F16K 31/12* (2006.01)

(52) U.S. Cl. ..................... 251/31; 251/29; 91/382

(58) Field of Classification Search .................... 251/31, 251/29; 137/487.5; 91/382, 384, 368
See application file for complete search history.

(56) References Cited

U.S. PATENT DOCUMENTS

| | | | | |
|---|---|---|---|---|
| 3,489,294 | A * | 1/1970 | Young et al. | 212/278 |
| 3,745,883 | A * | 7/1973 | Ward et al. | 91/186 |
| 3,878,765 | A * | 4/1975 | Walters et al. | 91/433 |
| 4,718,869 | A * | 1/1988 | Fisher | 440/1 |
| 4,953,445 | A * | 9/1990 | Kervagoret et al. | 91/358 A |
| 6,286,412 | B1 * | 9/2001 | Manring et al. | 91/433 |
| 6,286,535 | B1 | 9/2001 | Harms et al. | |
| 6,981,428 | B2 * | 1/2006 | Donald et al. | 74/89.26 |
| 2004/0173381 | A1 * | 9/2004 | Moore et al. | 175/76 |
| 2005/0163639 | A1 * | 7/2005 | Gray, Jr. | 417/572 |
| 2008/0098881 | A1 * | 5/2008 | Warner | 91/382 |

FOREIGN PATENT DOCUMENTS

| | | | |
|---|---|---|---|
| JP | 2000301067 | A | 10/2000 |
| JP | 2000329070 | A | 11/2000 |
| JP | 2002013504 | A | 1/2002 |
| JP | 2009006389 | A | 1/2009 |

OTHER PUBLICATIONS

PCT Search Report; PCT/US2010/038318; Feb. 25, 2011, 8 pages.

* cited by examiner

*Primary Examiner* — John K Fristoe, Jr.
*Assistant Examiner* — Umashankar Venkatesan
(74) *Attorney, Agent, or Firm* — Brown & Michaels, PC

(57) ABSTRACT

A system for positioning a device such as a valve with a mechanical input using a fluid operated actuator, a mechanical position feedback member coupled to a feedback element of the fluid operated actuator and an activation fluid valve. The fluid operated actuator has an output coupled to the mechanical input of the valve, a feedback element for mechanically indicating a position of the valve, and inputs for actuating fluid, such that fluid at the inputs causes the fluid operated actuator to move in opposing directions. The activation fluid valve has outputs coupled to the inputs of the fluid operated actuator, a first opposing force input coupled to the mechanical position feedback member and a second opposing force input coupled to a control input force. The position of the activation fluid valve is controlled by a balance between the force from the mechanical feedback member and the control input force.

16 Claims, 13 Drawing Sheets

PROPORTIONAL POSITION FEEDBACK HYDRAULIC SERVO SYSTEM

REFERENCE TO RELATED APPLICATIONS

This application claims one or more inventions which were disclosed in Provisional Application No. 61/186,473, filed Jun. 12, 2009, entitled "PROPORTIONAL POSITION FEEDBACK HYDRAULIC SERVO SYSTEM". The benefit under 35 USC §119(e) of the United States provisional application is hereby claimed, and the aforementioned application is hereby incorporated herein by reference.

BACKGROUND OF THE INVENTION

Field of the Invention

The invention pertains to the field of servo systems. More particularly, the invention pertains to a proportional position feedback hydraulic servo system.

SUMMARY OF THE INVENTION

An actuator system for positioning a valve or other device with a mechanical input using a fluid operated actuator, a mechanical position feedback member coupled to a feedback element of the fluid operated actuator and a pilot valve. The fluid operated actuator has an output coupled to the mechanical input of the valve or other device, a feedback element for mechanically indicating a position of the valve or other device, and inputs for actuating fluid, such that fluid at the inputs causes the fluid operated actuator to move bi-directionally. The pilot valve has outputs coupled to the inputs of the fluid operated actuator, a first opposing force input coupled to the mechanical position feedback member and a second opposing force input coupled to a control input force, the first opposing force input and the second opposing force input being reciprocal to each other such that the position of the activation fluid valve is controlled by a balance between the force from the mechanical feedback member and the control input force.

DETAILED DESCRIPTION OF THE INVENTION

Figure 1:
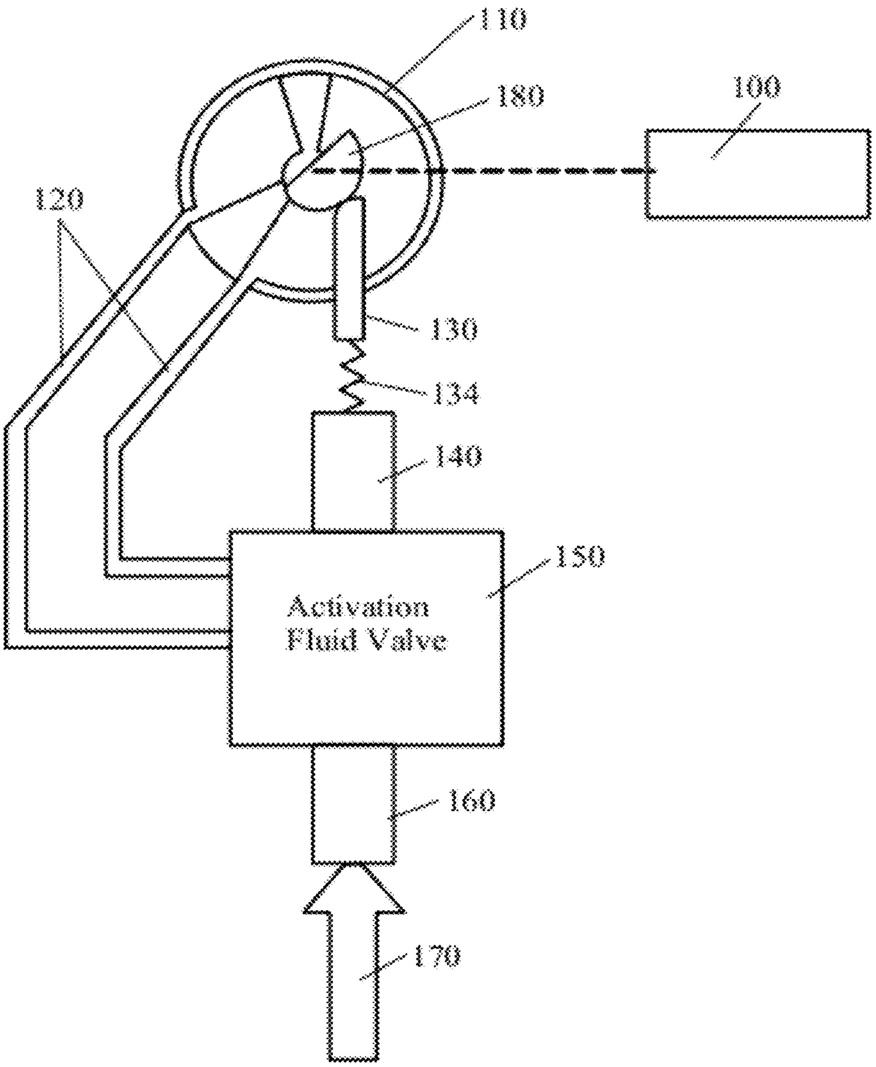
FIG. 1 shows a block diagram of a fluid servo system.

FIG. 1 shows a block diagram of a fluid servo system of the present invention. A valve or other device 100 has a mechanical input connected to the output of a fluid operated actuator 110. The fluid operated actuator 110 may be a rotary actuator, a linear actuator, or any other type of fluid operated actuator. The fluid can be oil or air or other fluids known to the art. A pilot valve 150 is connected to the fluid powered actuator 110 to operate the actuator 110 receiving mechanical position feedback through member 130 from the actuator 110. The mechanical position feedback member is coupled to a feedback element 180 of the fluid operated actuator. The feedback element 180 may be a cam or wedge in the case of a rotary actuator or directly off an element of a linear actuator. The mechanical position feedback member 130 applies a force relative to the actuator 110 position by a follower 130 on a cam or wedge 180 connected to the mechanical position feedback member 130, coupled to a resilient element 134 with known force versus deflection characteristics such as a spring on a first side 140 of the activation fluid valve 150. On a second opposing side 160 of the activation fluid valve 150 is a control input force 170. The control input force 170 may be provided by a fluid actuator, a mechanical actuator, or an electrical actuator. The embodiments discussed below exemplify the block diagram of FIG. 1, although other combinations are within the scope of the invention.

Figure 2A:
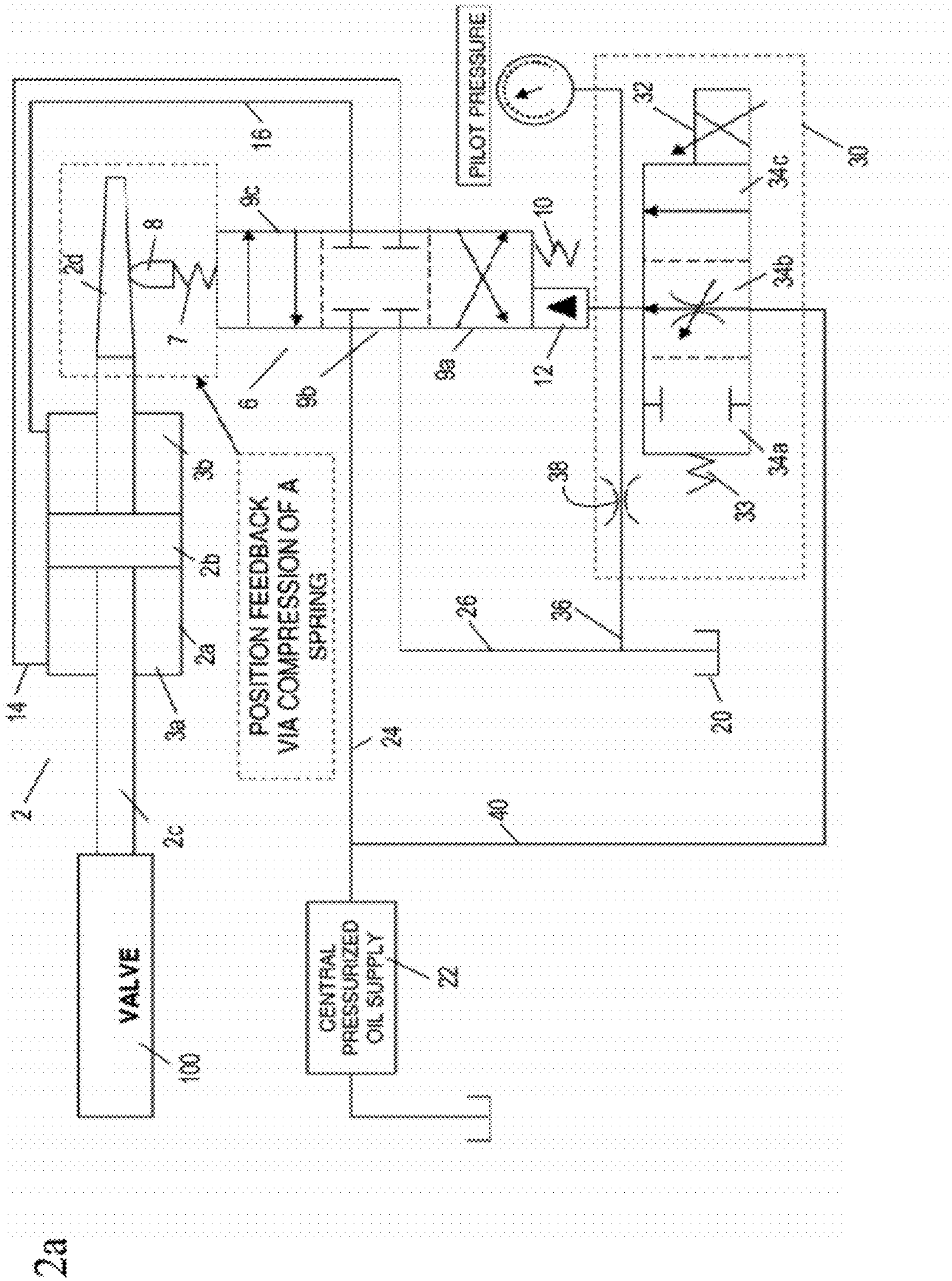
FIG. 2*a* shows a schematic of a fluid servo system of a first embodiment in an equilibrium position.
Figure 2B:
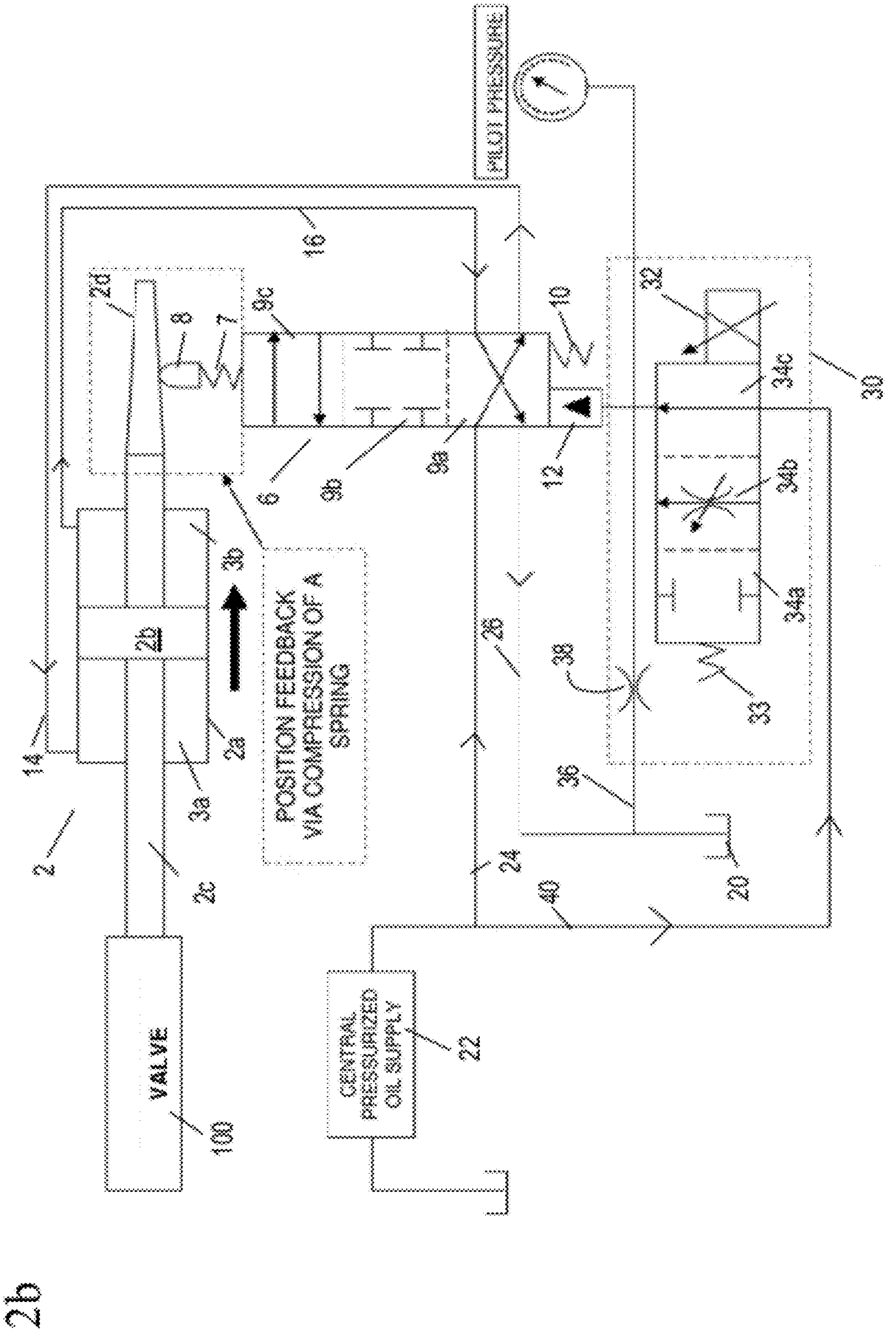
FIG. 2*b* shows a schematic of a fluid servo system of a first embodiment moving towards a first position.
Figure 2C:
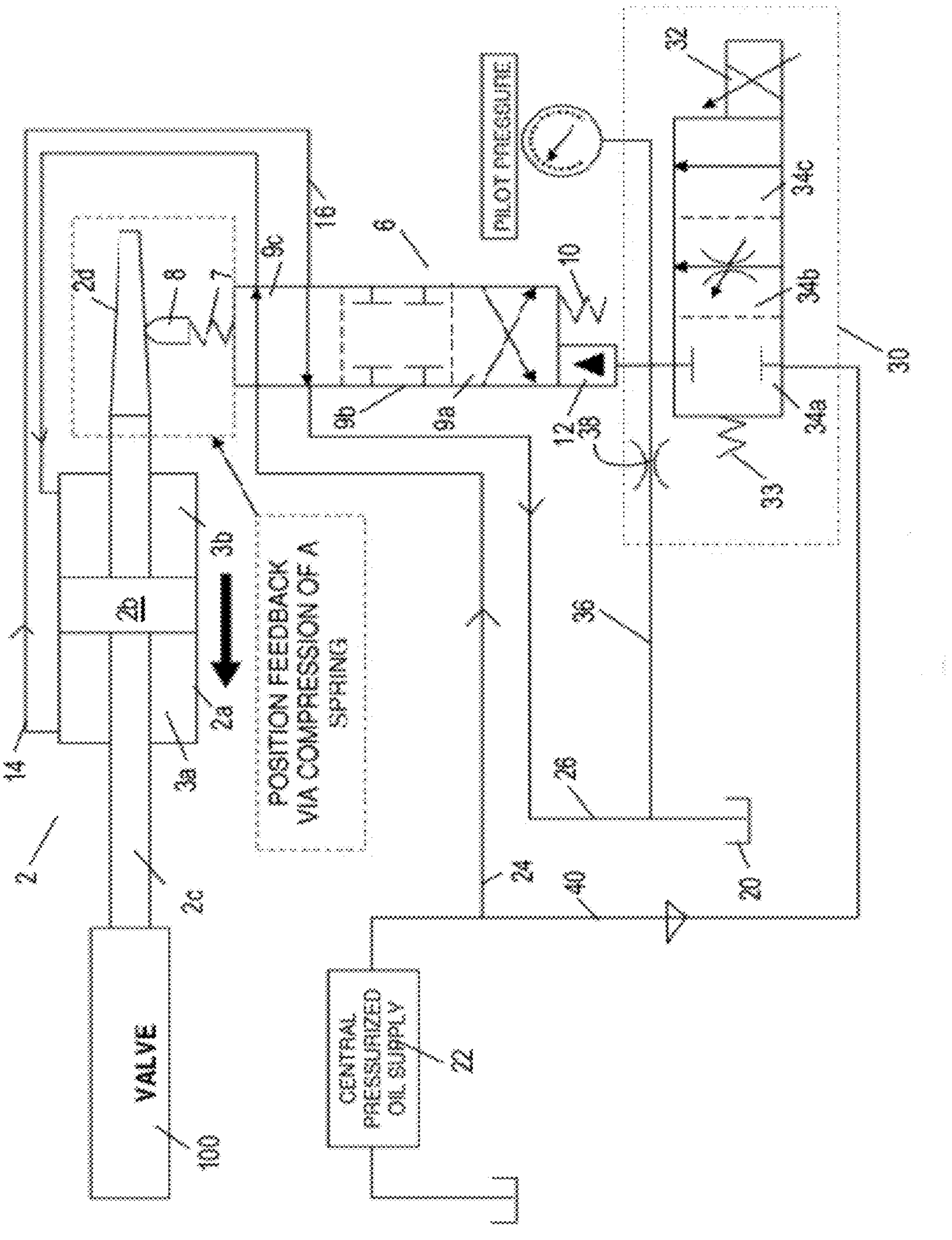
FIG. 2*c* shows a schematic of a fluid servo system in a first embodiment moving towards a second position.

FIGS. 2*a*-2*c* show schematics of a first embodiment of a hydraulic servo system as shown in FIG. 1, with proportional position feedback. FIG. 2*a* shows a schematic of a hydraulic servo system of a first embodiment in an equilibrium position. FIG. 2*b* shows a schematic of a hydraulic servo system of a first embodiment moving towards a first position. FIG. 2*c* shows a schematic of a hydraulic servo system in a first embodiment moving towards a second position. The fluid circuits of FIGS. 2*a*-2*c* are controlled by a meter in pilot.

In this embodiment, the fluid operated actuator 110 is a double acting hydraulic actuator 2 and is in fluid communication with the pilot valve 150, which is a pilot operated control valve 6. The double acting hydraulic actuator 2 operates a valve 100 or other device that is to be positioned (not shown) through mechanical input and a feedback element 180, for example, a rod 2*c* with a piston 2*b* that is received within the housing 2*a* of the hydraulic actuator 2. A first fluid chamber 3*a* is formed between the housing 2*a* and one side of the piston 2*b* and a second fluid chamber 3*b* is formed between the housing 2*a* and the other side of the piston 2*b*. Mechanical position feedback 130 from the actuator is applied by the end 2*d* of the rod 2*c* opposite the valve 100 which is preferably tapered and contacts a spring 7 of a pilot operated control valve 6 through a means 8 which compresses the spring 7 in proportion to the double acting hydraulic actuator motion. The means 8 may be a tab, a rotary device that feeds back via cam/spring or feedback may be via a spring that contacts the end of the rod 2*d*.

The pilot operated control valve 6 preferably includes a spool with a plurality of lands. The pilot operate control valve 6 has at least three distinct positions and an infinite number of intermediate positions. In a first position 9*a* and a second position 9*c*, fluid may flow between the central pressurized oil supply 22 and the pilot operated control valve 6 and between the pilot operated control valve 6 and the chambers 3*a*, 3*b* of the double acting hydraulic actuator 2. In a neutral or third position, 9*b*, fluid is restricted from flowing to or from the double acting hydraulic actuator 2. The pilot operated control valve 6 is moved between the positions by forces on the first side 140 and second side 160 of the valve 6. The pilot operated control valve 6 is calibrated by adjusting a spring 10 and actuated by a piloted pressure from a pilot port 12 on a second side 160 and a spring 7 on a first side 140 of the pilot operated control valve 6 that is in contact with the double acting hydraulic actuator 2 through means 8.

The piloted pressure on the second side 160 of the pilot operated control valve 6 is provided to the pilot port 12 by a control input force 170, which in this embodiment is a meter in pilot valve circuit. The meter in pilot valve circuit includes: a meter in analog or digital proportional flow control valve 30 that modulates the pilot pressure to the pilot port 12 of the pilot operated control valve 6, a pressure line 40 in fluid communication with a central pressurized oil supply 22, a hydraulic line 24 introducing fluid to chambers 3*a*, 3*b* in the hydraulic actuator 2 through the pilot operated control valve 6, a hydraulic line 26 receiving fluid from the pilot operated control valve 6 from which fluid is exiting the hydraulic actuator 2 to sump 20 and a hydraulic line 36 with a restriction 38 in fluid communication with line 26 leading to the pilot port 12 on the pilot operated control valve 6.

The proportional flow control valve 30 has at least three positions. The proportional flow control valve 30 is moved between the positions by a spring 33 one side of the valve and an analog proportional electric actuator such as a solenoid 32 on the opposite side of the valve. The proportional valve can also be a digital type that has a flow rate controlled by the duty cycle of a pulse width modulated (PWM) electrical signal In a first position 34*a*, fluid from the central pressurized oil supply 22 and line 40 are blocked and fluid to or from the pilot port 12 on the pilot operated control valve 6 is blocked from exiting through the valve 30. In a second position 34*c*, fluid from the central pressurized oil supply 22 and line 40 flows to the pilot port 12 on a second side of the pilot operated control valve 6 unrestricted. In a neutral or third position 34*b*, fluid from the central pressurized oil supply and line 40 flows to the pilot port 12 on a second side of the pilot operated control valve 6 through a restricted orifice of the analog or digital proportional flow control valve 30.

Referring to FIG. 2*a*, the pilot operated control valve 6 and the analog or digital proportional flow control valve 30 are in equilibrium positions 9*b*, 34*b*. In the equilibrium positions, the spring force 7 on the first side of the pilot operated control valve 6 and the force of the spring 10 and pilot force from the pilot port 12 on the second side of the pilot operated control valve 6 are equal. With the pilot operated control valve 6 in this position, fluid is restricted from flowing to or from the chambers 3*a*, 3*b* of the double acting hydraulic actuator 2. The force of the spring 33 on one side of the analog proportional flow control valve 30 is equal to the force of the proportional solenoid 32 on the opposite side of the proportional flow control valve 30. If a digital proportional flow control is used, the pressure applied to the actuator on the valve 6 is dependent upon the duty cycle of the PWM signal applied to the digital pilot valve solenoid 32 rather than being dependent of the current level. In other words, if the current to the analog proportional solenoid 32 is steady or if the duty cycle to the digital pilot valve is steady, position 9*b* will be maintained. With the proportional flow control valve 30 in the equilibrium position 34*b*, fluid from line 26 flows to line 36 and through a restriction 38 to the pilot port 12 on the second side of the pilot operated control valve 6 and fluid from line 40 in fluid communication with the central pressurized oil supply 22 flows through a restricted orifice of the proportional flow control valve 30 to the pilot port 12 on the second side of the pilot operated control valve 6.

Referring to FIG. 2*b*, the current to the proportional solenoid 32 on the one side of the proportional flow control valve 30 is increased and is greater than the force of the spring 33 on the other side of the proportional flow control valve 30, moving the valve to the left in the figure or towards the spring 33. In moving the proportional flow control valve 30 to position 34*c*, fluid from the central pressurized oil supply 22 and line 40 flows unrestricted to the pilot port 12 on the pilot operated control valve 6 and fluid from line 26 and line 36 flow through the restriction 38 to the pilot port 12. The same relationship exists if a digital flow control is used and if the duty cycle of the PWM signal to the digital flow control is increased. The force of spring 10 and pilot pressure from the pilot port 12 is greater than the spring force 7 on the opposite side of the pilot operated control valve 6, moving the pilot operated control valve 6 towards the spring 7 to a position 9*a*. With the pilot operated control valve 6 in this position, fluid from the central pressurized oil supply 22 flows through line 24, through the pilot operated control valve 6 to line 14 and the first chamber 3*a* of the double acting hydraulic actuator 2. The fluid in the first chamber 3*a* moves the piston 2*b* mounted to the rod 2*c* in the direction of the arrow shown in the figure, moving the tapered end 2*d* of the rod and the valve 100 (not shown) to a first position. Movement of the rod 2*c* of the double acting hydraulic actuator 2 compresses the tab 8 and the spring 7, providing position feedback of the double acting hydraulic actuator 2 to the pilot operated control valve 6. Fluid from the second chamber 3*b* exits the double acting hydraulic actuator 2 through line 16 to the pilot operated valve 6 to line 26 leading to sump 20 or to line 36 with the restriction 38 leading to the pilot port 12 on the pilot operated control valve 6.

Referring to FIG. 2*c*, the current to the proportional solenoid 32 on the one side of the proportional flow control valve 30 is decreased and the force of the spring 33 on the other side of the proportional flow control valve 30 is greater than the force of the proportional solenoid 32, moving the valve 30 to the right in the figure or away from the spring 33. In moving the proportional flow control valve 30 to position 34*a*, fluid from the central pressurized oil supply 22 through line 40 is blocked from flowing to the pilot port 12 on the pilot operated control valve 6. A small amount of fluid from line 26 and line 36 flows through the restriction 38 to the pilot port 12, but the pressure of this fluid is just enough to maintain equilibrium with the force of the spring 7. When the force of spring 7 is greater than the spring force 10 and the pilot port 12 on the opposite side of the pilot operated control valve 6, it moves the pilot operated control valve 6 away, decompressing spring 7 to attain position 9*c*. With the pilot operated control valve 6 in this position, fluid from the central pressurized oil supply 22 flows through line 24, through the pilot operated control valve 6 exhausted through line 16 from and the second chamber 3*b* of the double acting hydraulic actuator 2. The fluid in the first chamber 3*b* moves the piston 2*b* mounted to the rod 2*c* in the direction of the arrow shown in the figure, moving the tapered end 2*d* of the rod 2*c* and the valve 100 (not shown) to a second position. Movement of the rod 2*c* of the double acting hydraulic actuator 2 decompresses the tab 8 and the spring 7, providing position feedback of the double acting hydraulic actuator 2 to the pilot operated control valve 6. Fluid from the first chamber 3*a* exits the double acting hydraulic actuator 2 through line 14 to the pilot operated valve 6 to line 26, leading to sump 20 or to line 36 with the restriction 38. The same relationship exists if a digital flow control is used and the duty cycle of the PWM signal to the digital flow control is decreased.

Figure 3A:
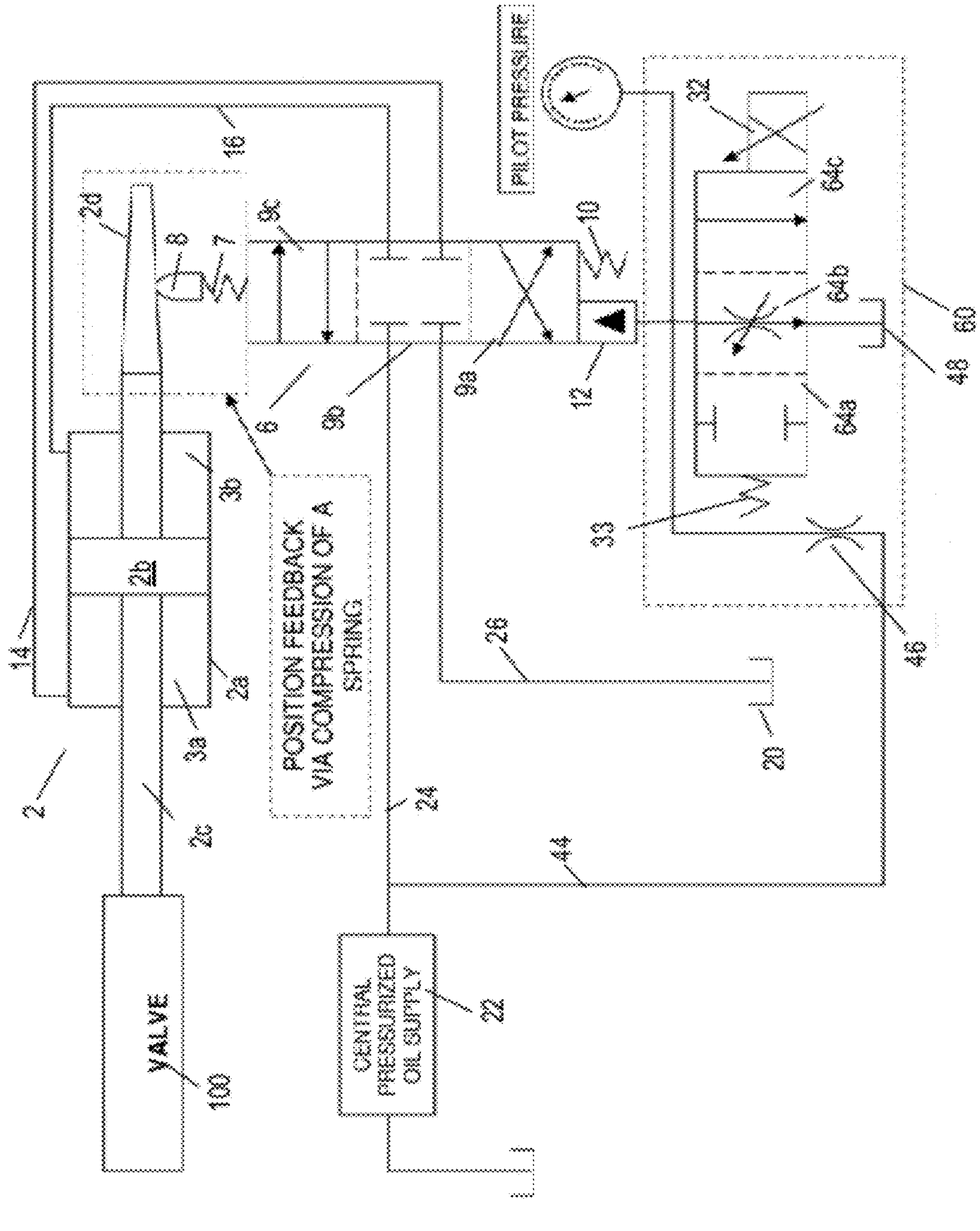
FIG. 3*a* shows a schematic of a fluid servo system of a second embodiment in an equilibrium position.
Figure 3B:
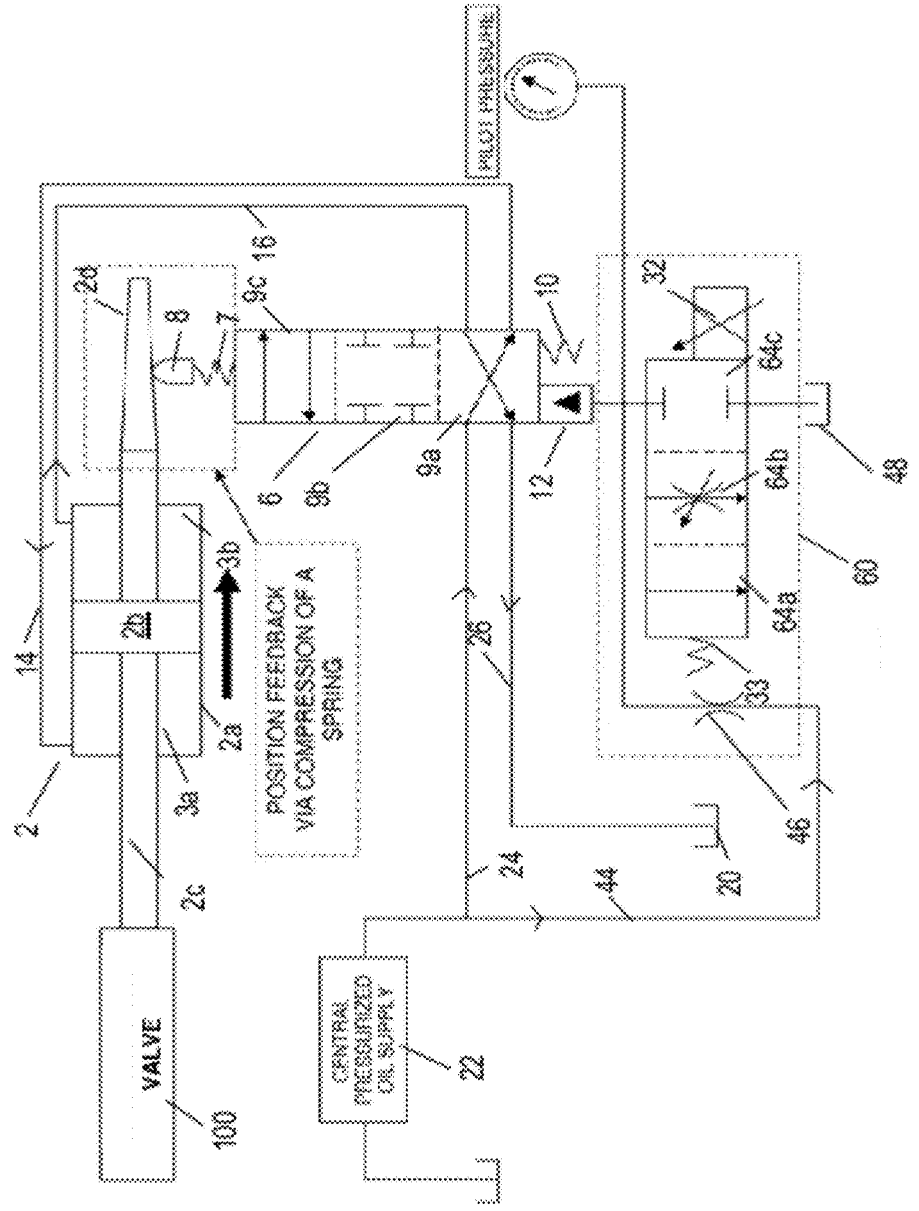
FIG. 3*b* shows a schematic of a fluid servo system of a second embodiment moving towards a first position.
Figure 3C:
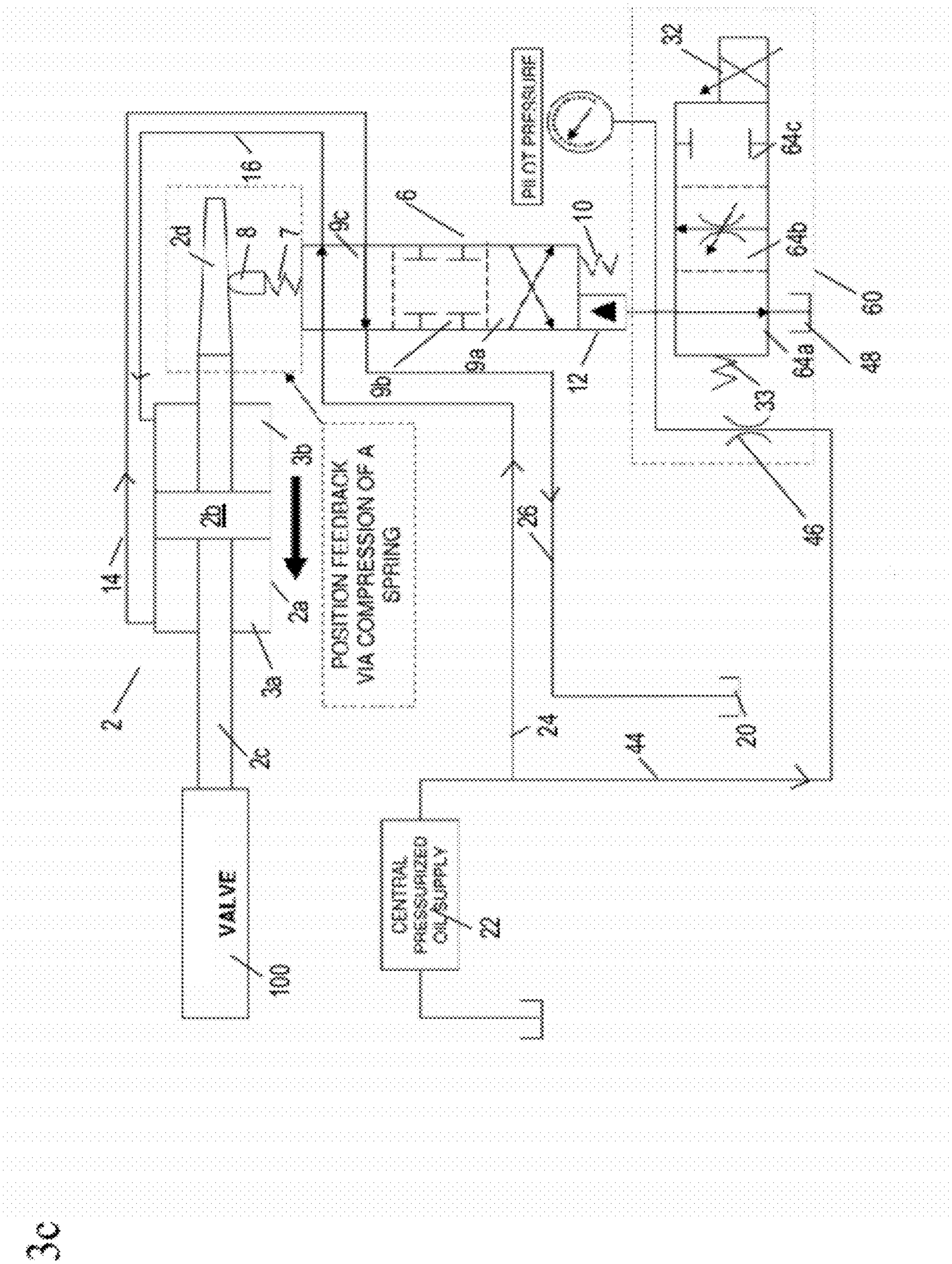
FIG. 3*c* shows a schematic of a fluid servo system in a second embodiment moving towards a second position.

FIGS. 3*a*-3*c* show schematics of a second embodiment hydraulic servo system as shown in FIG. 1 which includes proportional position feedback. FIG. 3*a* shows a schematic of a hydraulic servo system of a second embodiment in an equilibrium position. FIG. 3*b* shows a schematic of a hydraulic servo system of a second embodiment moving towards a first position. FIG. 3*c* shows a schematic of a hydraulic servo system in a second embodiment moving towards a second position.

One of the differences between the hydraulic servo system shown in FIGS. 2*a*-2*c* and the hydraulic servo system shown in FIGS. 3*a*-3*c* is the replacement of line 36 with a restriction 38 in fluid communication with line 26 and that the pilot port 12 on one of the pilot operated control valve 6 is in fluid communication with line 24, the central pressurized oil supply 22 and line 44 with a restriction 46. Another difference is that the analog or digital proportional flow control valve 60 of the second embodiment is in a meter out pilot valve circuit instead of a meter in pilot valve circuit as in the first embodiment and is controlled by an analog or digital proportional flow control valve 60.

In this embodiment, the fluid operated actuator 110 is a double acting hydraulic actuator 2 and is in fluid communication with the activation fluid valve 150, which is a pilot operated control valve 6. The double acting hydraulic actuator 2 operates a valve 100 (not shown) through mechanical input and a feedback element 180, for example, a rod 2*c* with a piston 2*b* that is received within the housing 2*a* of the hydraulic actuator 2. A first fluid chamber 3*a* is formed between the housing 2*a* and one side of the piston 2*b* and a second fluid chamber 3*b* is formed between the housing 2*a* and the other side of the piston 2*b*. Mechanical position feedback 130 from the actuator is preferably applied by the end 2*d* of the rod 2*c* opposite the valve 100 which is preferably tapered and contacts a spring 7 of a pilot operated control valve 6 through a means 8 which compresses the spring 7 in proportion to the double acting hydraulic actuator motion. The means 8 may be a tab, a rotary device that feeds back via cam/spring or feedback may be via a spring that contacts the end of the rod 2*d*.

The pilot operated control valve 6 preferably includes a spool with a plurality of lands. The pilot operate control valve 6 has at least three positions. In a first position 9*a* and a second position 9*c*, fluid may flow between the central pressurized oil supply 22 and the pilot operated control valve 6 and between the pilot operated control valve 6 and the chambers 3*a*, 3*b* of the double acting hydraulic actuator 2. In an equilibrium position or third position, 9*b*, fluid is prevented from flowing to or from the double acting hydraulic actuator 2. The pilot operated control valve 6 is moved between the positions by forces on the first side 140 and second side 160 of the pilot operated control valve 6. The pilot operated control valve 6 is actuated by a spring 10 and piloted pressure from a pilot port 12 on a second side 160 and a spring 7 on a first side 140 of the pilot operated control valve 6 that is in contact with the double acting hydraulic actuator 2 through means 8.

The piloted pressure on the second side 160 of the pilot operated valve 6 is provided by a control input force 170, which in this embodiment is a meter out pilot valve circuit. The meter out pilot valve circuit includes a meter out analog or digital proportional flow control valve 60 that modulates the pilot pressure of the pilot port 12 of the pilot operated control valve 6, a pressure line 44 with a restriction 46 in fluid communication with a central pressurized oil supply 22, line 24; a hydraulic line 24 introducing fluid to chambers 3*a*, 3*b* in the hydraulic actuator 2 through the pilot operated control valve 6, and a hydraulic line 26 receiving fluid from the pilot operated control valve 6 from which fluid is exiting the hydraulic actuator to sump 20. The analog or digital proportional flow control valve 60 has three distinct positions and an infinite number of intermediate positions. The analog or digital proportional flow control valve 60 is moved by a spring 33 on one side of the valve and a proportional solenoid 32 on the opposite side of the valve. In a first position 64*a*, fluid from the pilot port 12 on the pilot operated control valve 6 flows to sump 48. In a second position 64*c*, fluid is blocked from flowing to or from the pilot port 12 to sump 48. In an equilibrium position or third position 64*b*, fluid from the pilot port 12 flows to the sump 48 through a variable orifice.

Referring to FIG. 3*a*, the pilot operated control valve 6 and the analog proportional flow control valve 60 are in the equilibrium positions 9*b*, 64*b*. In the equilibrium position, the spring force 7 on the first side 140 of the pilot operated control valve 6 and the force of the spring 10 and pilot force from the pilot port 12 on the second side 160 of the pilot operated control valve 6 are equal. With the pilot operated control valve 6 in this position, fluid is restricted from flowing to or from the chambers 3*a*, 3*b* of the double acting hydraulic actuator 2. The force of the spring 33 on one side of the proportional flow control valve 60 is equal to the force of the proportional solenoid 32. In other words the current to the proportional solenoid 32 is steady. With the proportional flow control valve 60 in the equilibrium position 64*b*, fluid from the pilot port 12 on the pilot operated control valve 6 flows to sump 48 through a variable orifice of the proportional flow control valve 60. Fluid also flows from central pressurized oil supply 22 into line 44, through the restriction 46 to the pilot port 12 on the pilot operated control valve 6. The force of the fluid from line 44 that flows into the pilot port 12 and the flow through the variable orifice of the proportional flow control valve 60 to sump 48 in addition with the force provided by spring 10 is equal to the force of the spring 7 on the opposite side of the pilot operated control valve 6. If a digital proportional flow control is used, the pressure applied to the an actuator on the valve 6 is dependent upon the duty cycle of the PWM signal applied to the digital pilot valve solenoid rather than being dependent of the current level.

Referring to FIG. 3*b*, the current to the proportional solenoid 32 on the one side of the analog proportional flow control valve 60 is increased and is greater than the force of the spring 33 on the other side of the analog proportional flow control valve 60, moving the valve 60 to the left in the figure or towards the spring 33. In moving the analog proportional flow control valve 60 to position 64*c*, fluid from the pilot port 12 on the pilot operated control valve 6 is blocked from flowing to sump 48. Fluid from the central pressurized oil supply 44 flows through restriction 46 to the pilot port 12 on the pilot operated control valve 6. The force of spring 10 and pilot pressure from the pilot port 12 is greater than the spring force 7 on the opposite side of the pilot operated control valve 6, moving the pilot operated control valve 6 to the towards the spring 7 to a position 9*a*. With the pilot operated control valve 6 in this position, fluid from the central pressurized oil supply 22 flows through line 24, through the pilot operated control valve 6 to line 14 and the first chamber 3*a* of the double acting hydraulic actuator 2. The fluid in the first chamber 3*a* moves the piston 2*b* mounted to the rod 2*c* in the direction of the arrow shown in the figure, moving the tapered end 2*d* of the rod 2*c* and the valve 100 (not shown) to a first position. Movement of the rod 2*c* of the double acting hydraulic actuator 2 compresses the tab 8 and the spring 7, providing position feedback of the double acting hydraulic actuator 2 to the pilot operated control valve 6. Fluid from the second chamber 3*b* exits the double acting hydraulic actuator 2 through line 16 to the pilot operated valve 6 to line 26 leading to sump 20.

Referring to FIG. 3*c*, the current to the proportional solenoid 32 on the one side of the analog proportional flow control valve 60 is decreased and the force of the spring 33 on the other side of the proportional flow control valve 60 is greater than the force of the proportional solenoid 32, moving the valve 60 to the right in the figure or away from the spring 33. In moving the proportional flow control valve 60 to position 64*a*, fluid from the pilot port 12 on the pilot operated control valve 6 exits through the proportional flow control valve 60 to sump 48. While fluid from the central pressurized oil supply 22 is still supplied to the pilot port 12 through line 44 and the restriction 46, this fluid also drains through the proportional flow control valve 60 to sump 48. Any pressure or force of the fluid flowing to the pilot port 12 is not significant enough to over power the force of the spring 7. The force of spring 7 is greater than the spring force 10 and the pilot port 12 on the opposite side of the pilot operated control valve 6, moving the pilot operated control valve 6 away the spring 7 to a position 9*c*. With the pilot operated control valve 6 in this position, fluid from the central pressurized oil supply 22 flows through line 24, through the pilot operated control valve 6 to line 16 and the second chamber 3*b* of the double acting hydraulic actuator 2. The fluid in the first chamber 3*b* moves the piston 2*b* mounted to the rod 2*c* in the direction of the arrow shown in the figure, moving the tapered end 2*d* of the rod 2*c* and the valve 100 (not shown) to a second position. Movement of the rod 2*c* of the double acting hydraulic actuator 2 decompresses the tab 8 and the spring 7, providing position feedback of the double acting hydraulic actuator 2 to the pilot operated control valve 6. Fluid from the first chamber 3*a* exits the double acting hydraulic actuator 2 through line 14 to the pilot operated valve 6 to line 26 leading to sump 20. If digital proportional flow control is used, the pressure applied to the actuator on valve 6 is dependent upon the duty cycle of the PWM signal applied to the digital pilot valve solenoid rather than being dependent of the current level.

Figure 4A:
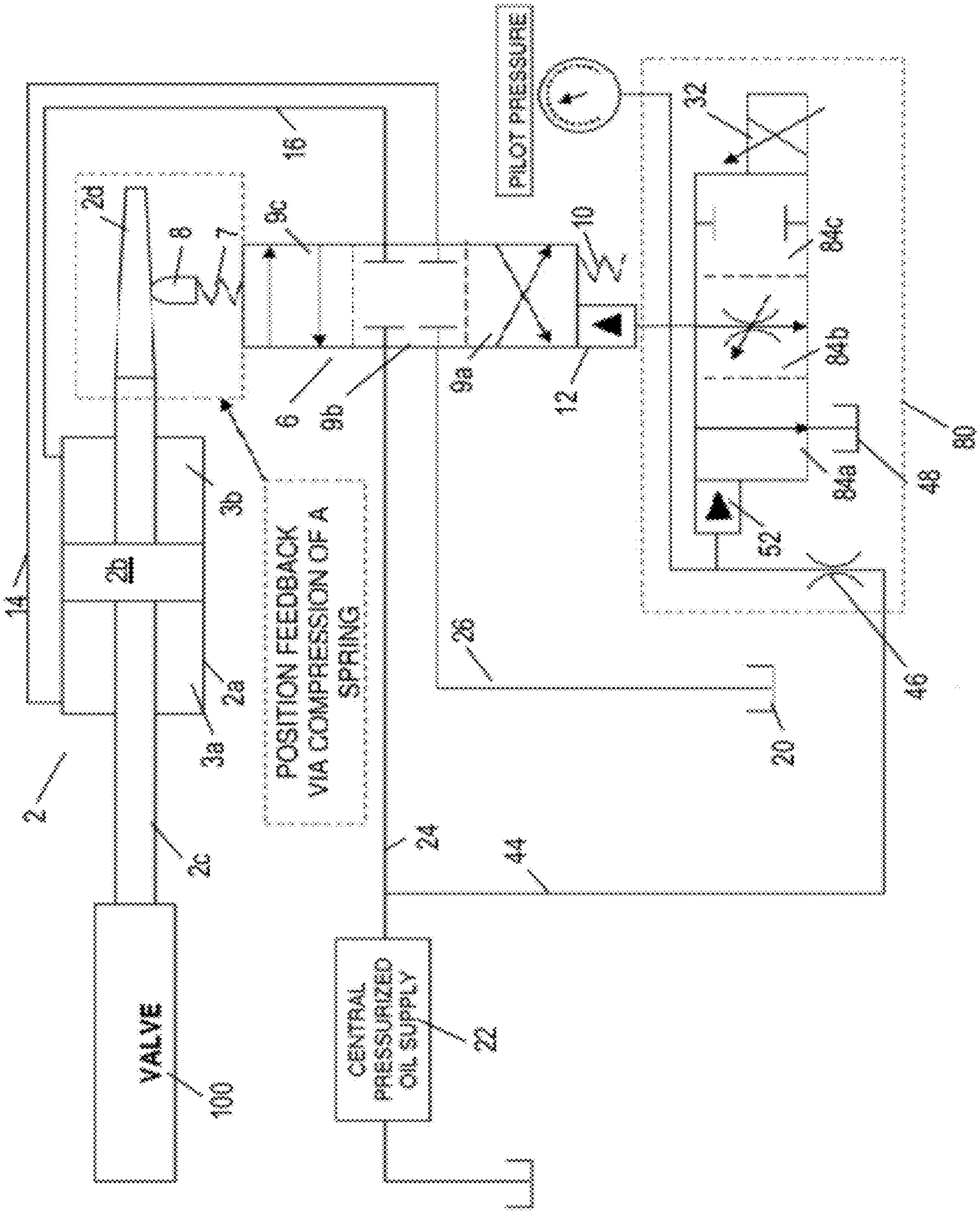
FIG. 4*a* shows a schematic of a fluid servo system of a third embodiment in an equilibrium position.
Figure 4B:
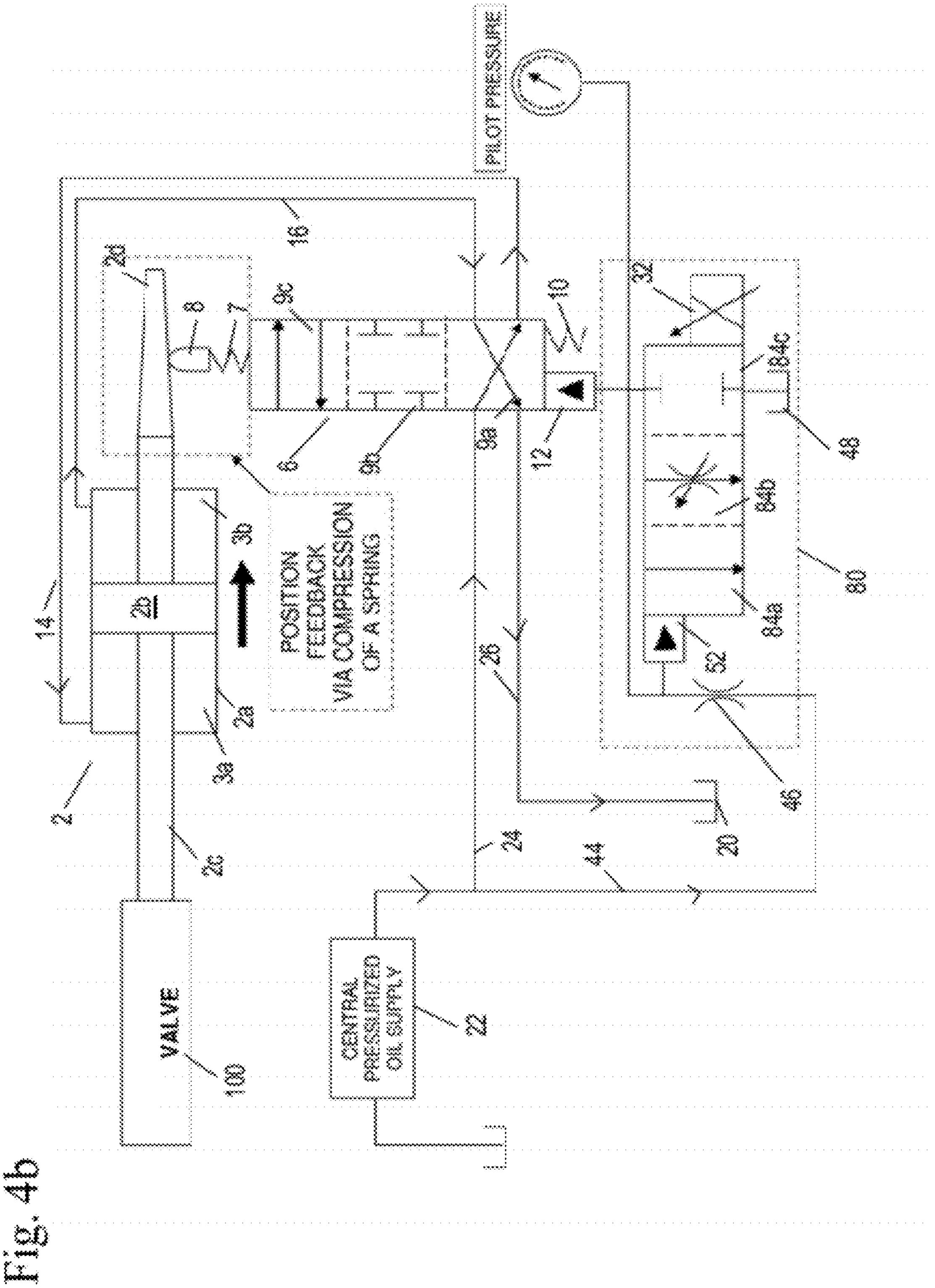
FIG. 4*b* shows a schematic of a fluid servo system of a third embodiment moving towards a first position.
Figure 4C:
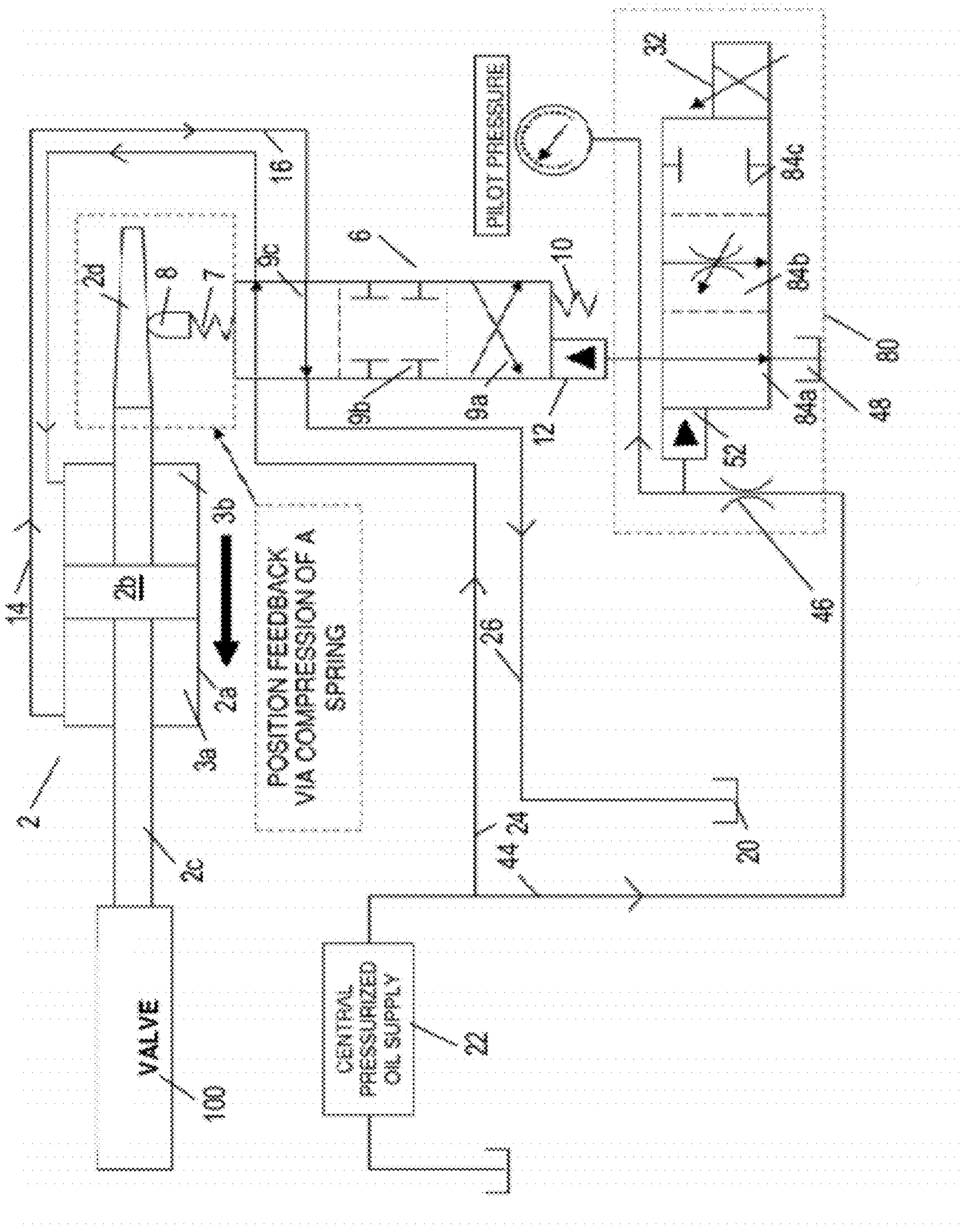
FIG. 4*c* shows a schematic of a fluid servo system in a third embodiment moving towards a second position.

FIGS. 4*a*-4*c* show schematics of a third embodiment of a hydraulic servo system as shown in FIG. 1, with proportional position feedback. FIG. 4*a* shows a schematic of a hydraulic servo system of a third embodiment in an equilibrium position. FIG. 4*b* shows a schematic of a hydraulic servo system of a third embodiment moving towards a first position. FIG. 4*c* shows a schematic of a hydraulic servo system in a third embodiment moving towards a second position. The fluid circuits of FIGS. 4*a*-4*c* are controlled by a meter out pilot.

One of the differences between the hydraulic servo system of shown in FIGS. 2*a*-2*c* and the hydraulic servo system shown in FIGS. 4*a*-4*c* is the replacement of line 36 with a restriction 38 in fluid communication with line 26 and the pilot port 12 on the pilot operated control valve 6. Line 44 contains a restriction 46 and is in fluid communication with line 24 and the central pressurized oil supply 22 and is also in fluid communication with the pilot port 12 on one side of the pilot operated control valve 6. Another difference is that the proportional flow control valve 60 of the second embodiment is in a meter out pilot valve circuit instead of a meter in pilot valve circuit as in the first embodiment and is controlled by a proportional relief control valve instead of a proportional flow control valve as in the second embodiment.

In this embodiment, the fluid operated actuator 110 is a double acting hydraulic actuator 2 and is in fluid communication with the activation fluid valve 150, which is a pilot operated control valve 6. The double acting hydraulic actuator 2 operates a valve 100 or other device (not shown) through mechanical input and a feedback element 180, for example, a rod 2*c* with a piston 2*b* that is received within the housing 2*a* of the hydraulic actuator 2. A first fluid chamber 3*a* is formed between the housing 2*a* and one side of the piston 2*b* and a second fluid chamber 3*b* is formed between the housing 2*a* and the other side of the piston 2*b*. Mechanical position feedback 130 from the actuator is preferably applied by the end 2*d* of the rod 2*c* opposite the valve 100 which is preferably tapered and contacts a spring 7 of a pilot operated control valve 6 through a means 8 which compresses the spring 7 in proportion to the double acting hydraulic actuator motion. The means 8 may be a tab, a rotary device that feeds back via cam/spring or feedback may be via a spring that contacts the end of the rod 2*d*.

The pilot operated control valve 6 includes a spool with a plurality of lands. The pilot operate control valve 6 has at least three positions. In a first position 9*a* and a second position 9*c*, fluid may flow between the central pressurized oil supply 22 and the pilot operated control valve 6 and between the pilot operated control valve 6 and the chambers 3*a*, 3*b* of the double acting hydraulic actuator 2. In a neutral or third position, 9*b*, fluid is prevented from flowing to or from the double acting hydraulic actuator 2. The pilot operated control valve 6 is moved between the positions by forces on the first side 140 and second side 160 of the pilot operated control valve 6. The pilot operated control valve 6 is actuated by a spring 10 and piloted pressure from a pilot port 12 on a second side 160 and a spring 7 on a first side 140 of the pilot operated control valve 6 that is in contact with the double acting hydraulic actuator 2.

The piloted pressure on the second side 160 of the pilot operated control valve 6 is provided by a control input force 170, which in this embodiment is a meter out pilot valve circuit. The meter out pilot valve circuit includes a meter out proportional relief control valve 80 that modulates the pilot pressure from the pilot port 12 of the pilot operated control valve 6, a pressure line 44 with a restriction 46 in fluid communication with a central pressurized oil supply 22, line 24, the pilot port 12 on the pilot operated control valve 6, and the pilot port 52 on one side of the proportional relief control valve 80; a hydraulic line 24 introducing fluid to a chamber 3*a*, 3*b* in the hydraulic actuator 2 through the pilot operated control valve 6, and a hydraulic line 26 receiving fluid from the pilot operated control valve 6 from which fluid is exiting the hydraulic actuator 2 to sump 20. The proportional relief control valve 80 has at least three positions. The proportional relief control valve 80 is moved between the positions by pressure from the pilot port 52 one side of the valve and a proportional solenoid 32 on the opposite side of the valve. In a first position 84*a*, fluid from the pilot port 12 on the pilot operated control valve 6 flows to sump 48. In a second position 84*c*, fluid is blocked from flowing to or from the pilot port 12 to sump 48. In an equilibrium position or third position 84*b*, fluid from the pilot port 12 flows to the sump 48 through a variable orifice of the proportional relief control valve 80.

Referring to FIG. 4*a*, the pilot operated control valve 6 and the proportional relief control valve 80 are in the equilibrium positions 9*b*, 84*b*. In the equilibrium position, the spring force 7 on the first side of the pilot operated control valve 6 and the force of the spring 10 and pilot force from the pilot port 12 on the second side of the pilot operated control valve 6 are equal. With the pilot operated control valve 6 in this position, fluid is restricted from flowing to or from the chambers 3*a*, 3*b* of the double acting hydraulic actuator 2. Fluid flows from central pressurized oil supply 22 into line 44, through the restriction 46 to the pilot port 52 on one side of the proportional relief control valve 80. The pilot force from the pilot port 52 on one side of the proportional relief control valve 80 is equal to the force of the proportional solenoid 32 on the opposite side of the proportional relief control valve 80. In other words the current to the proportional solenoid 32 is steady. With the proportional relief control valve 80 in the equilibrium position 84*b*, fluid from the pilot port 12 on the pilot operated control valve 6 flows to sump 48 through a variable orifice of the proportional relief control valve 80. Fluid also flows from central pressurized oil supply 22 into line 44, through the restriction 46 to the pilot port 12 on the pilot operated control valve 6. The force of the fluid from line 44 that flows into the pilot port 12 and the flow through the variable orifice of the proportional relief control valve 80 to sump 48 in addition the force provided by spring 10 is equal to the force of the spring 7 on the opposite side of the pilot operated control valve 6 of the pilot operated control valve 6.

Referring to FIG. 4*b*, the current to the proportional solenoid 32 on the one side of the proportional relief control valve 80 is increased and is greater than the pilot force from the pilot port 52 on the other side of the proportional relief control valve 80, moving the valve to the left in the figure or towards the pilot port 52. In moving the proportional relief control valve 80 to position 84*c*, fluid from the pilot port 12 on the pilot operated control valve 6 is blocked from flowing to sump 48. Fluid from the central pressurized oil supply 44 flows through restriction 46 to the pilot port 12 on the pilot operated control valve 6. The force of spring 10 and pilot pressure from the pilot port 12 is greater than the spring force 7 on the opposite side of the pilot operated control valve 6, moving the pilot operated control valve 6 to the towards the spring 7 to a position 9*a*. With the pilot operated control valve 6 in this position, fluid from the central pressurized oil supply 22 flows through line 24, through the pilot operated control valve 6 to line 14 and the first chamber 3*a* of the double acting hydraulic actuator 2. The fluid in the first chamber 3*a* moves the piston 2*b* mounted to the rod 2*c* in the direction of the arrow shown in the figure, moving the tapered end 2*d* of the rod 2*c* and the valve 100 or other device (not shown) to a first position. Movement of the rod 2*c* of the double acting hydraulic actuator 2 compresses the tab 8 and the spring 7, providing position feedback of the double acting hydraulic actuator 2 to the pilot operated control valve 6. Fluid from the second chamber 3*b* exits the double acting hydraulic actuator 2 through line 16 to the pilot operated valve 6 to line 26 leading to sump 20.

Referring to FIG. 4*c*, the current to the proportional solenoid 32 on the one side of the proportional relief control valve 80 is decreased and the pilot force of pilot port 52 on the other side of the proportional relief control valve 80 is greater than the force of the proportional solenoid 32, moving the valve to the right in the figure or away from the pilot port 52. In moving the proportional relief control valve 80 to position 84*a*, fluid from the pilot port 12 on the pilot operated control valve 6 exits through the proportional relief control valve 80 to sump 48. While fluid from the central pressurized oil supply 22 is still supplied to the pilot port 12 through line 44 and the restriction 46, this fluid also drains through the proportional relief control valve 80 to sump 48. Any pressure or force of the fluid flowing to the pilot port 12 is not significant enough to over power the force of the spring 7. The force of spring 7 is greater than the spring force 10 and the pilot port 12 on the opposite side of the pilot operated control valve 6, moving the pilot operated control valve 6 to decompress spring 7 to attain position 9*c*. With the pilot operated control valve 6 in this position, fluid from the central pressurized oil supply 22 flows through line 24, through the pilot operated control valve 6 to line 16 and the second chamber 3*b* of the double acting hydraulic actuator 2. The fluid in the first chamber 3*b* moves the piston 2*b* mounted to the rod 2*c* in the direction of the arrow shown in the figure, moving the tapered end 2*d* of the rod 2*c* and the valve 100 (not shown). Movement of the rod 2*c* of the double acting hydraulic actuator 2 decompresses the tab 8 and the spring 7, providing position feedback of the double acting hydraulic actuator 2 to the pilot operated control valve 6. Fluid from the first chamber 3*a* exits the double acting hydraulic actuator 2 through line 14 to the pilot operated valve 6 to line 26 leading to sump 20.

Figure 5A:
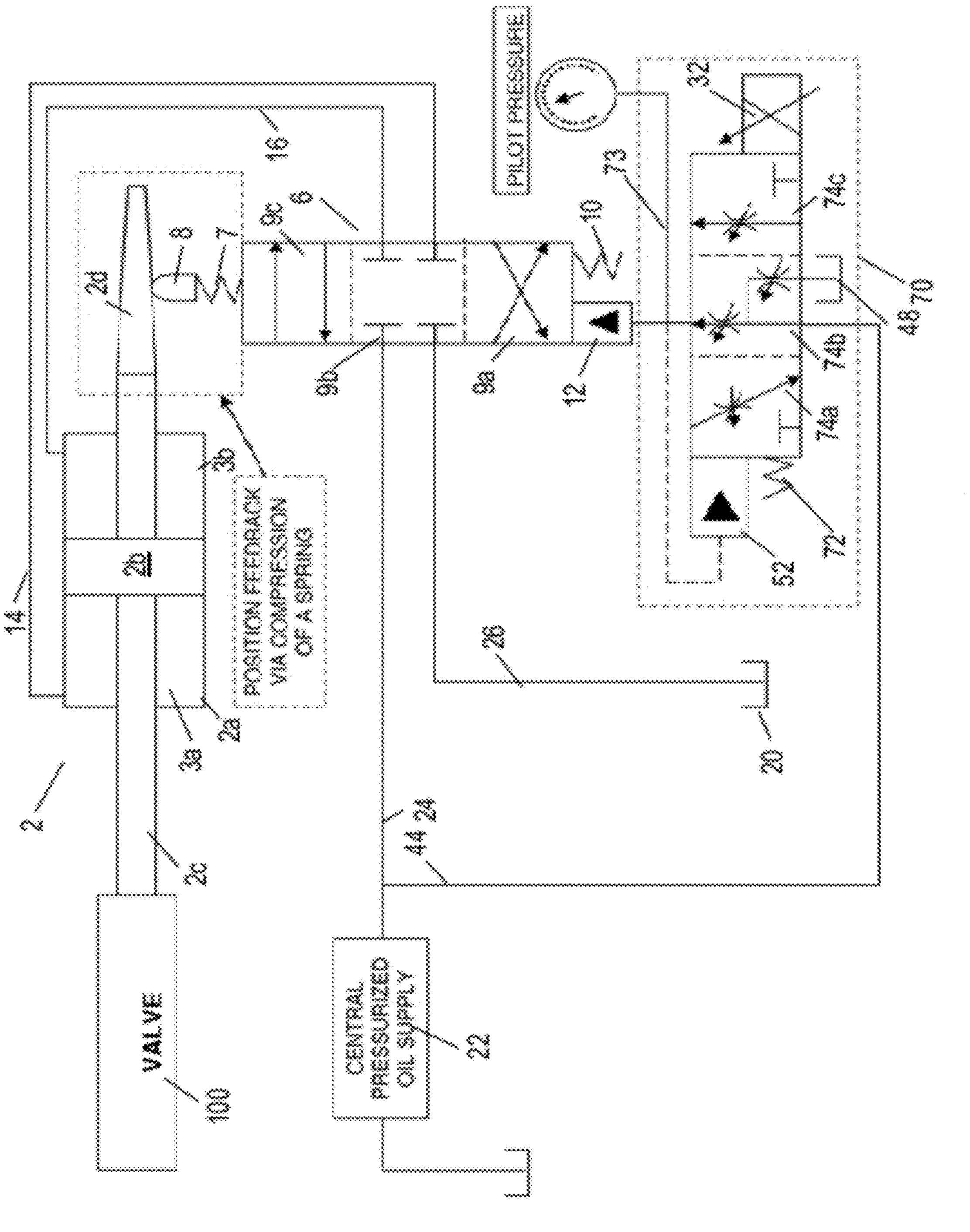
FIG. 5*a* shows a schematic of a fluid servo system of fourth embodiment in an equilibrium position.
Figure 5B:
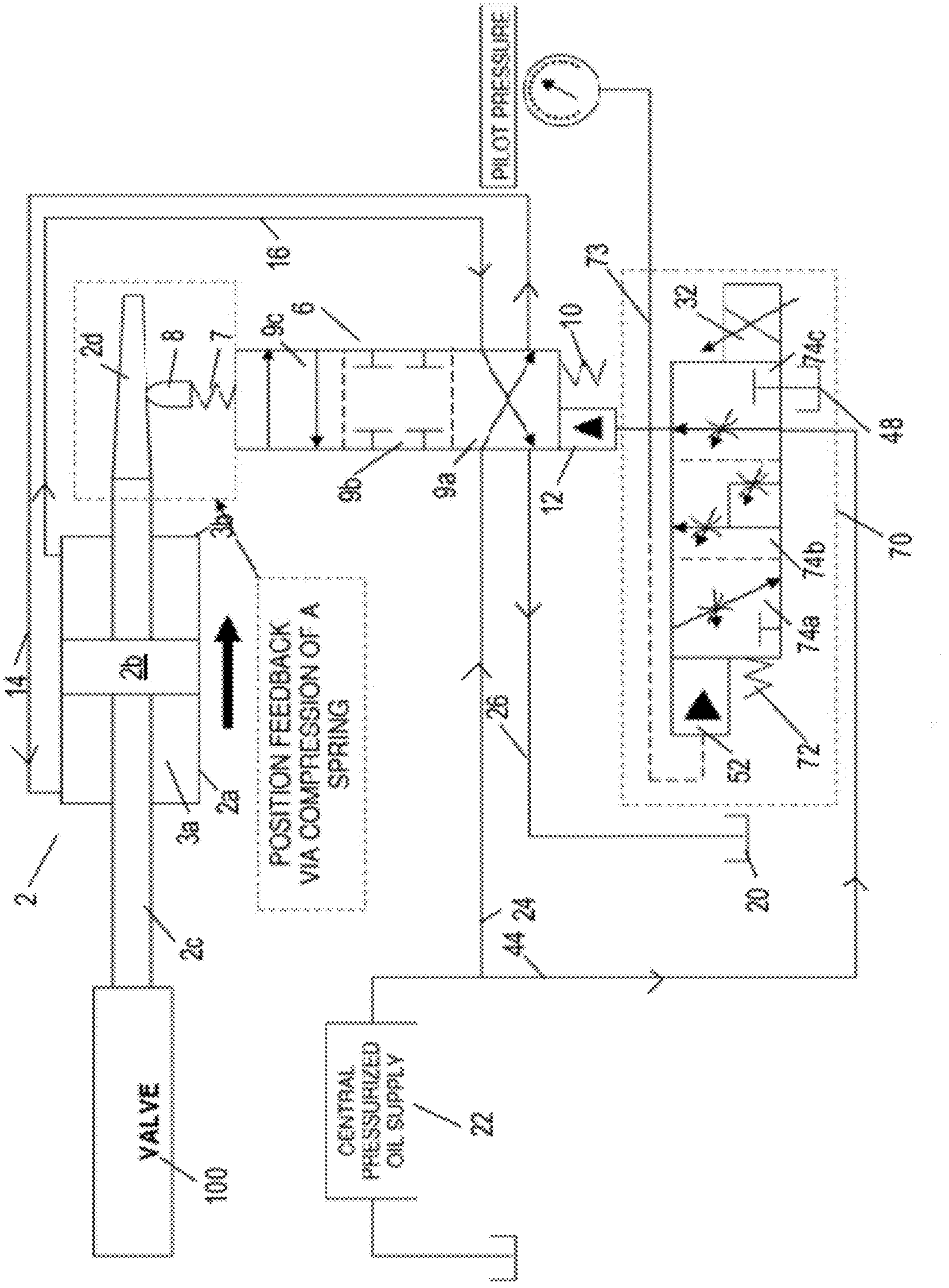
FIG. 5*b* shows a schematic of a fluid servo system of a fourth embodiment moving towards a first position.
Figure 5C:
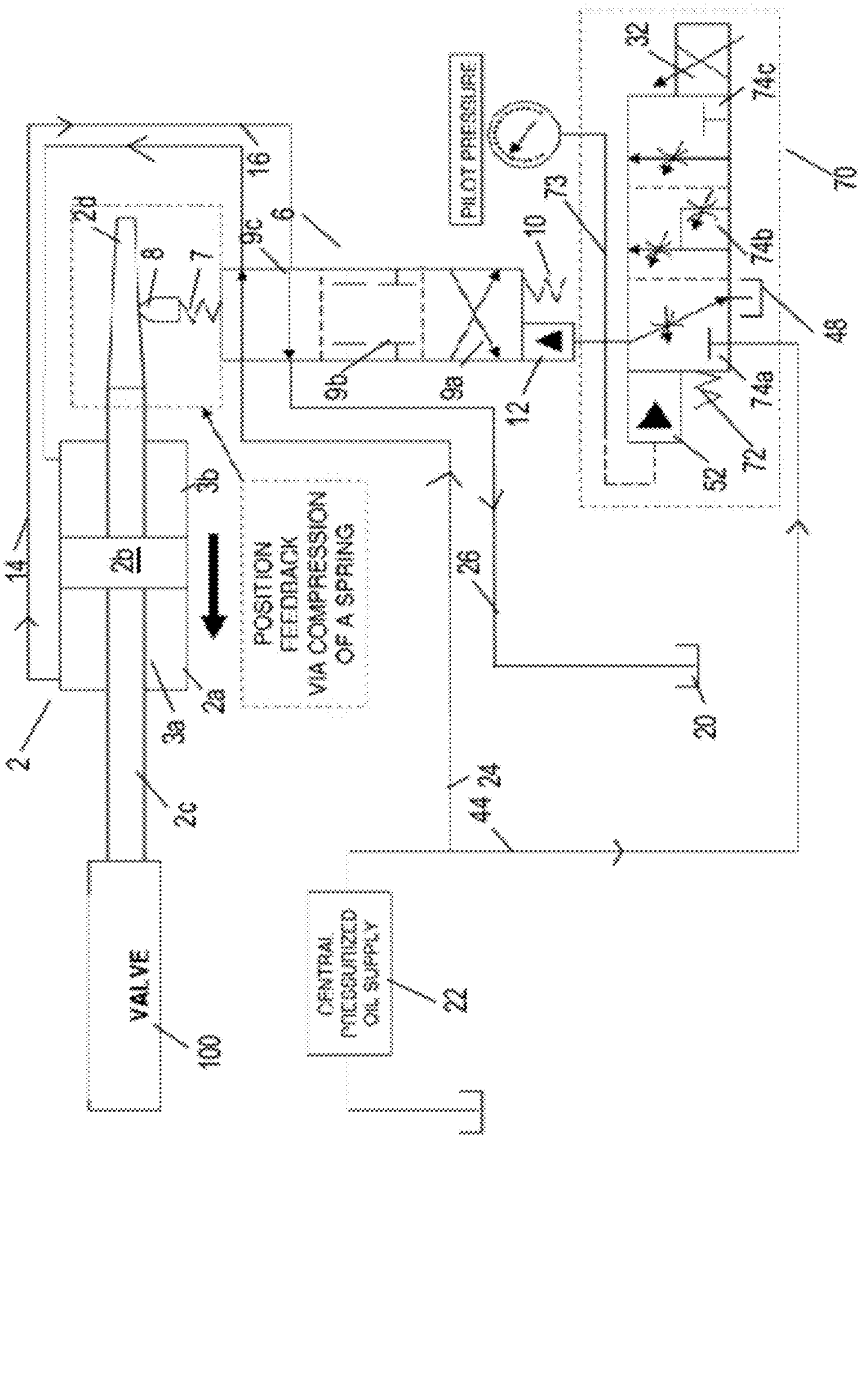
FIG. 5*c* shows a schematic of a fluid servo system of a fourth embodiment moving towards a second position.

FIGS. 5*a*-5*c* show schematics of fourth embodiment of a hydraulic servo system as shown in FIG. 1, with proportional position feedback. FIG. 5*a* shows a schematic of a hydraulic servo system of a fourth embodiment in an equilibrium position. FIG. 5*b* shows a schematic of a hydraulic servo system of a fourth embodiment moving towards a first position. FIG. 5*c* shows a schematic of a hydraulic servo system in a fourth embodiment moving towards a second position.

In this embodiment, the fluid operated actuator 110 is a double acting hydraulic actuator 2 and is in fluid communication with the activation fluid valve 150, which is a pilot operated control valve 6. The double acting hydraulic actuator 2 operates a valve 100 or other device (not shown) through mechanical input and a feedback element 180, for example, a rod 2*c* with a piston 2*b* that is received within the housing 2*a* of the hydraulic actuator 2. A first fluid chamber 3*a* is formed between the housing 2*a* and one side of the piston 2*b* and a second fluid chamber 3*b* is formed between the housing 2*a* and the other side of the piston 2*b*. Mechanical position feedback 130 from the actuator is preferably applied by the end 2*d* of the rod 2*c* opposite the valve 100 which is preferably tapered and contacts a spring 7 of a pilot operated control valve 6 through a means 8 which compresses the spring 7 in proportion to the double acting hydraulic actuator motion. The means 8 may be a tab, a rotary device that feeds back via cam/spring or feedback may be via a spring that contacts the end of the rod 2*d*.

The pilot operated control valve 6 includes a spool with a plurality of lands. The pilot operate control valve 6 has at least three distinct positions and an infinite number of intermediate positions. In a first position 9*a* and a second position 9*c*, fluid may flow between the central pressurized oil supply 22 and the pilot operated control valve 6 and the pilot operated control valve 6 and the chambers 3*a*, 3*b* of the double acting hydraulic actuator 2. In a neutral or third position, 9*b*, fluid is prevented from flowing to or from the double acting hydraulic actuator 2. The pilot operated control valve 6 is moved between the positions by forces on the first side 140 and second side 160 of the pilot operated control valve 6. The pilot operated control valve 6 is actuated by a spring 10 and piloted pressure from a pilot port 12 on a second side 160 and a spring 7 on a first side 140 of the pilot operated control valve 6 that is in contact with the double acting hydraulic actuator 2.

The piloted pressure on the second side 160 of the pilot operated control valve 6 is provided to the pilot port 12 by a control input force 170, which in this embodiment is a pressure control valve meter in pilot valve circuit. The pressure control valve meter in pilot valve circuit includes a meter in proportional pressure control valve 70 that modulates the pilot pressure to the pilot port 12 of the pilot operated control valve 6, a pressure line 40 in fluid communication with a central pressurized oil supply 22 and in fluid communication with the proportional pressure control valve 70 leading to the pilot port 12 on the pilot operated control valve 6, a hydraulic line 24 introducing fluid to chambers 3*a*, 3*b* in the hydraulic actuator 2 through the pilot operated control valve 6, and a hydraulic line 26 receiving fluid from the pilot operated control valve 6 from which fluid is exiting the hydraulic actuator 2 to sump 20.

The proportional pressure control valve 70 has at least three positions. The proportional pressure control valve 70 is moved between the positions by a spring 72 and pilot port 52 one side of the valve and a proportional solenoid 32 on the opposite side of the valve. In a first position 74*a*, fluid from the central pressurized oil supply 22 and line 44 are blocked and fluid to or from the pilot port 12 on the pilot operated control valve 6 exits to sump 48 through a variable orifice of the proportional pressure control valve 70. In a second position 74*c*, fluid from the central pressurized oil supply 22 and line 44 flows to the pilot port 12 on the pilot operated control valve 6 through a variable orifice of the valve 70. In a neutral or third position 74*b*, fluid from the central pressurized oil supply 22 and line 44 flows to the pilot port 12 on the pilot operated control valve 6 through a variable orifice of the proportional pressure control valve 70 and another variable orifice leads to sump 48.

Referring to FIG. 5*a*, the pilot operated control valve 6 and the proportional pressure control valve 70 are in the equilibrium positions 9*b*, 74*b*. In the equilibrium positions, the spring force 7 on the first side of the pilot operated control valve 6 and the force of the spring 10 and pilot force on the second side of the pilot operated control valve 6 are equal. With the pilot operated control valve 6 in this position, fluid is blocked from flowing to or from the chambers 3*a*, 3*b* of the double acting hydraulic actuator 2. The force of the spring 72 and the pilot port 52 on one side of the proportional pressure control valve 70 is equal to the force of the proportional solenoid 32 on the opposite side of the proportional pressure control valve 70. In other words the current to the proportional solenoid 32 is steady. With the proportional pressure control valve 70 in the equilibrium position 74*b*, fluid from the central pressurized oil supply 22 flows to line 44 and through a variable orifice of the proportional flow control valve 70 to the pilot port 12 on the second side of the pilot operated control valve 6. Fluid flowing to the pilot port 12 on the second side of the pilot operated control valve 6 supplies fluid to line 73 leading to the pilot port 52 on one side of the proportional pressure control valve 70.

Referring to FIG. 5*b*, the current to the proportional solenoid 32 on the one side of the proportional pressure control valve 70 is increased and is greater than the force of the spring 72 and the pilot port 52 on the other side of the proportional pressure control valve 70, moving the valve to the left in the figure or towards the spring 72 and pilot port 52. In moving the proportional pressure control valve 70 to position 74*c*, fluid from the central pressurized oil supply 22 and line 44 flows through a variable orifice of the proportional pressure control valve 70 to the pilot port 12 on the pilot operated control valve 6. The force of spring 10 and pilot pressure from the pilot port 12 is greater than the spring force 7 on the opposite side of the pilot operated control valve 6, moving the pilot operated control valve 6 towards the spring 7 to a position 9*a*. With the pilot operated control valve 6 in this position, fluid from the central pressurized oil supply 22 flows through line 24, through the pilot operated control valve 6 to line 14 and the first chamber 3*a* of the double acting hydraulic actuator 2. The fluid in the first chamber 3*a* moves the piston 2*b* mounted to the rod 2*c* in the direction of the arrow shown in the figure, moving the tapered end 2*d* of the rod 2*c* and the valve 100 (not shown) to a first position. Movement of the rod 2*c* of the double acting hydraulic actuator 2 compresses the tab 8 and the spring 7, providing position feedback of the double acting hydraulic actuator 2 to the pilot operated control valve 6. Fluid from the second chamber 3*b* exits the double acting hydraulic actuator 2 through line 16 to the pilot operated valve 6 to line 26 leading to sump 20.

Referring to FIG. 5*c*, the current to the proportional solenoid 32 on the one side of the proportional pressure control valve 70 is decreased and the force of the spring 72 and the pilot port 52 on the other side of the proportional pressure control valve 70 is greater than the force of the proportional solenoid 32, moving the valve 70 to the right in the figure or away from the spring 72 and pilot port 52. In moving the proportional pressure control valve 70 to position 74*a*, fluid from the central pressurized oil supply 22 through line 44 is blocked from flowing through the proportional pressure control valve 70 to the pilot port 12 on the pilot operated control valve 6. Any fluid in the pilot port 12 flows out through a variable orifice of the proportional pressure control valve 70 to sump 48 and to line 73 to pilot port 52, aiding in moving the proportional pressure control valve 70 with the aid of the spring 72 to the right in the figure. With the remainder of the fluid flowing to sump 48, the force of spring 7 is greater than the spring force 10 and the pilot port 12 on the opposite side of the pilot operated control valve 6, moving the pilot operated control valve 6 away the spring 7 to a position 9*c*. With the pilot operated control valve 6 in this position, fluid from the central pressurized oil supply 22 flows through line 24, through the pilot operated control valve 6 to line 16 and the second chamber 3*b* of the double acting hydraulic actuator 2. The fluid in the first chamber 3*b* moves the piston 2*b* mounted to the rod 2*c* in the direction of the arrow shown in the figure, moving the tapered end 2*d* of the rod 2*c* and the valve 100 (not shown) to a second position. Movement of the rod 2*c* of the double acting hydraulic actuator 2 decompresses the tab 8 and the spring 7, providing position feedback of the double acting hydraulic actuator 2 to the pilot operated control valve 6. Fluid from the first chamber 3*a* exits the double acting hydraulic actuator 2 through line 14 to the pilot operated valve 6 to line 26 leading to sump 20.

FIGS. 5*a*-5*c* are examples of fluid circuits that are controlled by a proportional relieving pressure reducing pilot valve.

The valve 100 may be a gas operated valve, a waste gate valve, an EGR valve, a turbocharger, or a bypass valve, or any other device that needs to be positioned.

The pilot operated control valve and the proportional flow control valve and the proportional relieving pressure reducing pilot valve each have at least three distinct positions and an infinite number of intermediate positions.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An actuator system for positioning a valve or device with a mechanical input comprising:

- a fluid operated actuator comprising an output coupled to the mechanical input of the valve, a feedback element for mechanically indicating a position of the valve or device, and inputs for actuating fluid, such that fluid at the inputs causes the fluid operated actuator to move in opposing directions; and
- a mechanical position feedback member coupled to the feedback element of the fluid operated actuator; and
- an activation fluid valve having outputs coupled to the inputs of the fluid operated actuator, a first opposing force input coupled to the mechanical position feedback member and a second opposing force input coupled to a control input force, the control input force comprising a proportional control valve for modulating pilot pressure to a pilot port, the first opposing force input and the second opposing force input being reciprocal to each other such that the position of the activation fluid valve is controlled by a balance between the force from the mechanical feedback member and the control input force.

2. The actuator system of claim 1, wherein the fluid operated actuator is a linear actuator.

3. The actuator system of claim 2, in which the feedback element is a rod with a tapered end coupled to the linear actuator.

4. The actuator system of claim 1, wherein the fluid operated actuator is a rotary actuator.

5. The actuator system of claim 4, in which the feedback element is a cam coupled to the rotary actuator.

6. The actuator system of claim 1, wherein the mechanical position feedback is a follower in mechanical contact with the feedback element coupled to a resilient element coupled to the first opposing force input.

7. The actuator system of claim 1, wherein the fluid operated actuator further comprises at least a first chamber and a second chamber in fluid communication with the inputs.

8. The actuator system of claim 1, wherein the proportional control valve is analog.

9. The actuator system of claim 1, wherein the proportional control valve is digital.

10. The actuator system of claim 1, wherein the proportional control valve is moveable to a first position in which fluid flows from a fluid supply through the proportional control valve to the pilot port on the second side of the activation fluid valve and to a second position in which fluid is blocked from flowing from a fluid supply to the pilot port on the second side of the activation fluid valve.

11. The actuator system of claim 10, wherein the fluid flowing through the proportional control valve to the pilot port on the second side of the activation fluid valve is restricted.

12. The actuator system of claim 1, wherein the proportional control valve is moveable to a first position in which fluid flows from the pilot port on the second side of the activation fluid valve through the proportion control valve to a sump and to a second position in which fluid is blocked from flowing from the pilot port on the second side of the activation fluid valve through the proportional control valve.

13. The actuator system of claim 12, wherein the fluid flowing from the pilot port on the second side of the activation fluid valve through the proportional control valve is restricted.

14. The actuator system of claim 1, wherein the proportional control valve is moveable in a first direction by a solenoid and a second direction by a resilient element.

15. The actuator system of claim 1, wherein the proportional control valve is moveable in a first direction by a solenoid and a second direction by a pilot port supplied by a restricted line from a fluid supply.

16. The actuator system of claim 1, wherein the proportional control valve is moveable in a first direction by a solenoid and a second direction by a pilot port and a resilient element.

* * * * *